(12) United States Patent
Yerli

(10) Patent No.: US 11,341,727 B2
(45) Date of Patent: May 24, 2022

(54) LOCATION-BASED PLATFORM FOR MULTIPLE 3D ENGINES FOR DELIVERING LOCATION-BASED 3D CONTENT TO A USER

(71) Applicant: THE CALANY HOLDING S. À R.L., Luxembourg (LU)

(72) Inventor: Cevat Yerli, Frankfurt am Main (DE)

(73) Assignee: THE CALANY Holding S. À R.L., Luxembourg (LU)

( * ) Notice: Subject to any disclaimer, the term of this patent is extended or adjusted under 35 U.S.C. 154(b) by 0 days.

(21) Appl. No.: 16/904,163

(22) Filed: Jun. 17, 2020

(65) Prior Publication Data

US 2020/0402314 A1 Dec. 24, 2020

Related U.S. Application Data

(60) Provisional application No. 62/863,090, filed on Jun. 18, 2019.

(51) Int. Cl.
  *G06T 19/00* (2011.01)
  *G06T 15/20* (2011.01)
  *G06T 15/30* (2011.01)
  *H04N 7/15* (2006.01)

(52) U.S. Cl.
  CPC .......... *G06T 19/006* (2013.01); *G06T 15/205* (2013.01); *G06T 15/30* (2013.01); *H04N 7/157* (2013.01)

(58) Field of Classification Search
  None
  See application file for complete search history.

(56) References Cited

U.S. PATENT DOCUMENTS

| 8,239,132 B2 | 8/2012 | Ma et al. |
| 8,564,621 B2 | 10/2013 | Branson et al. |
| 8,681,179 B2 | 3/2014 | Rolleston et al. |

(Continued)

FOREIGN PATENT DOCUMENTS

| WO | 2016/077493 A1 | 5/2016 |
| WO | 2018/144315 A1 | 8/2018 |
| WO | 2016/077493 A8 | 5/2019 |

OTHER PUBLICATIONS

Office Action dated Mar. 18, 2021 issued in U.S. Appl. No. 16/902,512, filed Jun. 16, 2020, 28 pages.

(Continued)

*Primary Examiner* — Robert J Craddock
(74) *Attorney, Agent, or Firm* — Christensen O'Connor Johnson Kindness PLLC

(57) ABSTRACT

A location-based platform for hosting multiple 3D engines delivering location-based 3D content. An engine platform server system is configured to host one or more engine servers hosting 3D engines and to provide an engine platform comprising digital reality applications developed via the 3D engines. The digital reality applications are configured in pre-determined locations within a persistent virtual world system or in mobile virtual replicas of corresponding real-world objects. Client devices approaching a digital reality application send the viewing position and orientation along with a view request to the engine platform server, which requests virtual frames from respective 3D engines, composites each virtual frame into one view, and sends the resulting media stream to users via the client devices.

20 Claims, 12 Drawing Sheets

(56) References Cited

U.S. PATENT DOCUMENTS

| | | |
|---|---|---|
| 9,129,429 B2 | 9/2015 | Hammond |
| 9,142,038 B2 | 9/2015 | Lotto et al. |
| 9,165,318 B1 | 10/2015 | Pauley et al. |
| 9,319,835 B2 | 4/2016 | Smith et al. |
| 9,338,599 B1 | 5/2016 | Burgmeier et al. |
| 9,721,386 B1 | 8/2017 | Worley, III et al. |
| 10,679,428 B1 | 6/2020 | Chen et al. |
| 2002/0158873 A1 | 10/2002 | Williamson |
| 2003/0007678 A1 | 1/2003 | Ohta |
| 2004/0249809 A1 | 12/2004 | Ramani et al. |
| 2005/0131607 A1 | 6/2005 | Breed |
| 2007/0115282 A1 | 5/2007 | Turner et al. |
| 2009/0244059 A1 | 10/2009 | Kulkarni et al. |
| 2009/0292464 A1 | 11/2009 | Fuchs et al. |
| 2010/0325154 A1 | 12/2010 | Schloter et al. |
| 2012/0236158 A1 | 9/2012 | Oleksy et al. |
| 2012/0249416 A1 | 10/2012 | Maciocci et al. |
| 2012/0309373 A1 | 12/2012 | Abogendia |
| 2013/0009994 A1 | 1/2013 | Hill |
| 2013/0178257 A1 | 7/2013 | Langseth |
| 2013/0194164 A1 | 8/2013 | Sugden et al. |
| 2013/0222369 A1 | 8/2013 | Huston et al. |
| 2014/0002444 A1 | 1/2014 | Bennett et al. |
| 2014/0114845 A1 | 4/2014 | Rogers et al. |
| 2014/0229542 A1 | 8/2014 | Yu et al. |
| 2014/0282220 A1 | 9/2014 | Wantland et al. |
| 2014/0313197 A1 | 10/2014 | Peuhkurinen |
| 2015/0188984 A1 | 7/2015 | Mullins |
| 2015/0235432 A1 | 8/2015 | Brounder et al. |
| 2015/0302664 A1 | 10/2015 | Miller |
| 2016/0026253 A1 | 1/2016 | Bradski et al. |
| 2016/0104452 A1 | 4/2016 | Guan et al. |
| 2016/0133230 A1 | 5/2016 | Daniels et al. |
| 2017/0024093 A1 | 1/2017 | Dziuk |
| 2017/0208109 A1 | 7/2017 | Akselrod et al. |
| 2017/0228937 A1 | 8/2017 | Murphy et al. |
| 2018/0005450 A1 | 1/2018 | Daniels et al. |
| 2018/0108184 A1 | 4/2018 | Takahashi |
| 2018/0204385 A1 | 7/2018 | Sarangdhar et al. |
| 2018/0276891 A1 | 9/2018 | Craner |
| 2018/0288393 A1 | 10/2018 | Yerli |
| 2019/0102946 A1 | 4/2019 | Spivack et al. |
| 2019/0172262 A1 | 6/2019 | McHugh et al. |
| 2019/0361797 A1 | 11/2019 | Yerli |
| 2019/0371073 A1 | 12/2019 | Harviainen |

OTHER PUBLICATIONS

Hu, S., et al., "A Mobile Location-Based Architecture for Intelligent Selecting Multi-Dimension Position Data Over Internet," Sino-Korea Chongqing GIS Researcher Center, Chongqing, China; Intelligence GIS Research Center, Department of Computer Science and Engineering, Inha University, Korea, 2017, 4 pages.

Pontikakos, C., et al., "Location-Based Services: Architecture Overview," Informatics Laboratory, Agricultural University of Athens, 2017, 11 pages.

European Search Report dated Nov. 6, 2020 issued in European Application No. EP20180791.4, 11 pages.

European Search Report dated Nov. 19, 2020 issued in European Application No. EP20180898.7, 9 pages.

European Search Report dated Nov. 6, 2020 issued in European Application No. EP20180805.2, 8 pages.

European Search Report dated Oct. 21, 2020, issued in European Application No. EP20180810.2, 8 pages.

Meenakshi, V., et al., "An Innovative App With for Location Finding With Augmented Reality Using CLOUD," Proceedings of the 2nd International Symposium on Big Data and Cloud Computing (ISBCC'15); Procedia Computer Science 50:585-589, 2015.

European Search Report dated Nov. 19, 2020 issued in European Application No. 20180869.8, 9 pages.

Office Action dated Nov. 15, 2021 issued in U.S. Appl. No. 16/901,968, filed Jun. 15, 2020, 21 pages.

Office Action dated Dec. 17, 2021, issued in U.S. Appl. No. 16/902,024, filed Jun. 15, 2020, 43 pages.

Office Action dated Dec. 21, 2021, issued in U.S. Appl. No. 16/903,114, filed Jun. 16, 2020, 13 pages.

Final Office Action dated Mar. 4, 2022, issued in U.S. Appl. No. 16/901,968, filed Jun. 15, 2020, 15 pages.

LOCATION-BASED PLATFORM FOR MULTIPLE 3D ENGINES FOR DELIVERING LOCATION-BASED 3D CONTENT TO A USER

CROSS-REFERENCE TO RELATED APPLICATION

This application claims the benefit of Provisional Application No. 62/863,090, filed Jun. 18, 2019, the entire disclosure of which is hereby incorporated by reference herein for all purposes.

FIELD

The present disclosure generally relates to computer systems, and more specifically to a system and computer-implemented method enabling delivery of location-based 3D content.

BACKGROUND

Current technological trends include the development of digital reality, which collectively includes augmented, virtual, and mixed reality technologies. The impact of these technologies may be considered a breakthrough that will revolutionize the entertainment, learning, financial, medical, mechanical, and other industries. Digital reality applications are developed via 3D engines, which offer an environment created specially to implement the functionalities that are specific for these applications.

However, developers may currently be constrained to choosing only one 3D engine at a time offered by a single 3D engine provider, with no current alternatives to choose among many 3D engines within a single marketplace. Likewise, end-users of the digital reality applications do not have access to a platform that includes a plurality of digital reality applications that are visible and accessible to them independent of which 3D engines were used during their development. For example, users may need to first download a digital reality application before they are able to receive media streams corresponding to the application. In this sense, the users may not be able to view the digital representations of the applications in the real world before they download and install the specific digital reality applications.

Therefore, improvements in the way that 3D engines and digital reality applications are provided to users are desired.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks described in the background or other technical problems are addressed through systems and methods of the current disclosure, which include a location-based platform for hosting multiple 3D engines delivering location-based 3D content. The system and method provide an engine platform, hosted in an engine platform server, which enables developers to select from a variety of engines (e.g., game engines) that may be used to create digital reality applications and position them in pre-determined real-world locations available in a persistent virtual world system, which may be stored in a database or data structure. The system and method further enable end users to view and interact with the digital reality applications in the pre-determined locations, where they receive a composited view of virtual frames with digital content from the digital reality applications that have been computed by one or more 3D engines. The resulting composited view is a reflection of the digital reality application as developed via the one or more game engines, which in some embodiments is provided to users in real-time and at a suitable frame rate (e.g., within about 60 to about 120 frames per second (FPS)).

In an embodiment, a system for enabling a location-based platform for hosting multiple 3D engines delivering location-based 3D content comprises an engine platform server system including one or more server computers, the engine platform server system configured to host one or more engine servers (e.g., engine servers provided by a third party) and to provide an engine platform, the engine platform including one or more digital reality applications developed via one or more 3D engines hosted in the engine servers or engine platform server. The digital reality application(s) are associated with (e.g., virtually attached to) pre-determined locations within a persistent virtual world system or mobile virtual replicas of corresponding real-world objects. In an embodiment, one or more client devices are connected to the engine platform server system via a network and are configured to provide the digital reality application(s) to users, enabling user interaction with the digital reality application(s).

In an embodiment, the engine platform system is configured to receive, as a client device approaches and renders an initial view of a digital reality application, a viewing position and orientation along with a corresponding view request from the client device. The engine platform server system is configured to, upon receiving the view request, request virtual frames from different 3D engines and composite the virtual frames into one media stream view and send the media stream view to the client device.

In some embodiments, the system may use a cloud and edge infrastructure that may implement distributed computing capabilities, comprising employing public or private clouds, cloudlets and edge systems, such as enterprise systems, mobile platforms, and user devices.

In some embodiments, the one or more 3D engines are local 3D engines hosted in the engine platform server. In other embodiments, the one or more 3D engines are third-party 3D engines hosted in the one or more third-party engine servers. After a pre-determined time or reaching a specified level of interaction, the client device may also need to download a runtime instance of the one or more 3D engines and of the application, thus switching from server rendering to local rendering. The one or more digital reality applications may be created through the one or more corresponding 3D engines. Thus, an application developer, when accessing the engine platform, may be able to seamlessly view and select from a variety of 3D engines.

The 3D engines available at the engine platform may offer an environment created specially to implement the functionalities that are specific to 3D digital reality applications. Thus, the 3D engines perform tasks that enable implementation of aspects such as the management of an animated model, the collisions between objects, the behavior and interaction of light with individual objects and between the objects of the scene, and the interaction between users and applications. The 3D engine may include, for example, a physical engine to simulate physical laws within the virtual environment, an audio engine to add music and complex acoustical effects, or an artificial intelligence (AI) engine to program computer intelligence behaviors. The 3D engines may be used in any type of application that requires rendering of 3D graphics at a real-time performance, including applications in Virtual Reality (VR), Augmented Reality (AR), Mixed Reality (MR), or combinations thereof.

In some embodiments, the digital reality applications are virtually attached to one or more pre-determined 3D locations selected within a persistent virtual world system available at the engine platform server, or to mobile virtual replicas whose location may change depending on the movement of the corresponding real element. The pre-determined 3D locations or mobile virtual replicas are selected during the development of the digital reality applications. When a user approaches one or more digital reality applications, the digital reality applications broadcast a proximity-based signal to the client device so that the client device is aware of the presence of a digital reality application in the proximity. The client device, upon receiving this signal, proceeds to send the viewing position and orientation along with a corresponding view request to the engine platform server. The engine platform server, upon receiving the view request, requests virtual frames from the one or more 3D engines employed in the development of the one or more digital reality applications, and then proceeds to composite each virtual frame into one view. Thus, the virtual frames are composed of pieces of data gathered from the one or more 3D engines, as users may be viewing areas that include more than one digital reality applications developed via several different 3D engines. The engine platform server then sends the composited view to the client device, which enables a smooth, natural, low-latency, and real-time view and interaction with the one or more digital reality applications.

According to an embodiment, the digital reality applications may utilize one or more of a plurality of techniques to broadcast a signal to the client devices, alerting the client devices that a digital reality application is available in proximity to the location of the client devices. In one embodiment, if the user has previously subscribed to the engine platform service, the location of the client device may be available at the persistent virtual world system stored in the engine platform server. Therefore, when a user approaches a digital reality application, the digital reality application may already prepare to broadcast the signals to the client device. In another embodiment, if the user has previously subscribed to the engine platform server or to one or more specific digital reality applications from the engine platform server, the digital reality application may constantly search for registered devices prior to broadcasting the signal. In another embodiment, the digital reality application may broadcast the signal when the digital reality application detects a device within a pre-defined proximity threshold in a pre-defined geographic location. For example, the pre-defined geographic location may be a building or a room within a building. In another example, the pre-defined geographic location may be within a city block. In a further example, the pre-defined geographic location may be within a city. In one embodiment, as a user with a client device enters a location where the digital reality application is active, the digital reality application may detect a signal from the device, indicating the device can receive a digital reality application media stream prior to broadcasting the signal.

In the current disclosure, the term "virtual frame" refers to one of the many elements (e.g., still images) that compose a virtual animation, which may be included in a media stream conveying the digital content of the digital reality application. For example, the virtual frames may be virtual sprites, or two-dimensional bitmaps that are integrated into one larger scene. When the virtual animation is displayed, each virtual frame is flashed to users on the pre-determined locations for a short time. The position and orientation at which the virtual frames are displayed to users depend on the viewing position and orientation of the users, which may be sensed by sensors installed in the client devices.

The plurality of virtual frames may be composited in order to generate a unified media stream to the client device that may be viewed and interacted with by a user. The media stream may include digital reality content including 3D image data, 3D geometries, 3D entities, 3D sensory data, 3D dynamic objects, video data, audio data, textual data, time data, positional data, orientational data, haptic data, and lighting data, amongst others.

In some embodiments, compositing of the virtual frames in order to generate one single media stream view for users may include sorting virtual frames or virtual frame sprites in 3D space; culling (e.g., viewport culling) of virtual frames in 3D space; performing depth-masking of virtual frames in order to enable partial blocking of the virtual frames based on the real world elements; requesting ingredients of virtual frames; and combining the virtual frames into one view. Alternatively, compositing of the virtual frames may include fewer or additional steps, in any combination. In some embodiments, compositing of the virtual frames is performed independent of the frame rate at which the virtual frames are received. In an embodiment, composited virtual frames are transmitted to a user via the client device at a natural frame rate of 60 FPS, 90 FPS, 120 FPS, another frame rate between 60 and 120 FPS, or some other frame rate. At this frame rate range, a user may get a feeling that the media stream, and thus the experience from the digital reality application, are received and engaged with in real time. In some embodiments, when third-party engine servers send their corresponding portions of the virtual frames, the third-party engine servers may render these virtual frame portions so that the virtual frames received by the engine platform server are already rendered.

In some embodiments sorting of virtual frames in 3D space refers to arranging the different elements of the virtual frame into a specific position and orientation in 3D space so that the media stream that will result from the animated virtual frames may be adjusted to the viewing position and orientation of the user.

In some embodiments, viewport culling of the virtual frames in 3D space may remove unnecessary elements from the view frustum of the virtual frame. The elements may be deemed unnecessary because, for example, they may lie completely outside the viewing frustum from the virtual frame, or they may be blocked by real world elements.

In some embodiments, depth-masking refers to the process of performing a partial blocking of some portions of the virtual frame, especially portions located in the background that may affect the depth of the image displayed on the virtual frame. Depth-masking may be performed employing several techniques known in the art, such as layer masking, clip masking, and alpha-channel masking, amongst others. In some embodiments, depth-masking is performed on geometries that are already available in a database or data structure stored in the engine platform server system and/or from virtual replicas of real world elements stored in the persistent virtual world system. In other embodiments, the depth-masking is performed on geometries that are generated in real-time by the engine platform server.

In some embodiments, requesting ingredients of the virtual frames refers to retrieving the actual content of virtual frames corresponding to the digital reality applications which will be part of the unified media stream.

In some embodiments, combining the virtual frames into one media stream view is performed by one or more of warping, stitching and interpolating the plurality of virtual frames, amongst others According to an embodiment, the digital content sent to the virtual frames by the one or more engines includes 3D icons. In an embodiment, 3D icons include one or more voxels, static 3D representations, dynamic 3D representation, or combinations thereof, as determined during the development stage of the digital reality applications, which are used to represent graphically the 3D application. The 3D icons may differ from 3D objects, in that the 3D icons are a basic graphic representation of the application, while 3D objects represent more immersive experiences once a user reaches a deeper level of engagement with the application. In an embodiment, 3D objects include mathematical models of graphical representations.

In some embodiments, the virtual frames may include elements rendered by the engine platform server. In other embodiments, the virtual frames may include elements rendered by the third party engine servers. In other embodiments, the virtual frames may include elements rendered by the client devices. In other embodiments, the virtual frames may include a mixture of elements rendered by the engine platform server, third-party engine servers, and the client devices.

By way of example, the virtual frames are initially rendered by the engine platform server or third-party engine servers, composited by the engine platform server, and output by the client device. In this example, the client device needs only to perform lightweight operations on the media stream. In further examples, the digital reality application is configured to be downloaded and executed locally by the client device. In an illustrative scenario, as user engagement with the digital reality application increases, the client device may proceed to fully download and install the digital reality application and 3D objects thereof, along with a runtime instance of the corresponding 3D engines, and to perform the rendering of the received media streams locally so that all or most of the virtual frames are rendered locally while executing the application. In other embodiments, after a pre-determined amount of time has elapsed since the user has viewed or engaged with the digital reality application, the client device may proceed to fully download the digital reality application and perform the rendering locally while executing the application.

The digital reality applications are viewable and may be interacted with via client devices that may include one or more mobile devices, personal computers, game consoles, smart contact lenses, media centers, and head-mounted displays, amongst others. The client devices may be equipped with sensors to determine a relative position and orientation of the client device (three coordinates) as well as a relative orientation of the headset (three angles) with respect to the viewer. In some embodiments, this tracking information provides position and orientation in 6 degrees of freedom for the client device that may determine how the output stream will be generated from the plurality of virtual frames.

In an embodiment, in order to reduce hardware and network demands, contribute to the reduction of network latency, and improve the general digital reality experience, the system may connect through a network including millimeter-wave (mmW) or combinations of mmW and sub 6 GHz communication systems, such as through $5^{th}$ generation wireless systems communication (5G). In other embodiments, the system may connect through a wireless local area networking (Wi-Fi) providing data at 60 GHz. Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive digital reality applications. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, the sensing mechanisms mounted on the client devices include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements. In some embodiments, tracking may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device. The sensing mechanisms of the client devices may also include one or more cameras. For example, the cameras may be depth-cameras installed in the client devices. The cameras may be configured to capture and provide the viewing position and orientation of the user which determines the viewing position and orientation of the virtual frames that are sent via the engine platform server.

Providing an accurate tracking of the connected elements may result useful for displaying a reliable status of client devices within the persistent virtual world system, in particular their position and orientation, which may be relevant for various applications. In addition, enabling an accurate, real-time tracking of client devices may reduce the need to physically sense other client devices.

According to an embodiment, a method of delivering location-based 3D content includes the steps of receiving, by the engine platform server system, a client device position and orientation along with a view request associated with a digital reality application; requesting, by the engine platform server system, virtual frames from the one or more 3D engines; receiving, by the engine platform server system, virtual frames sent by the one or more 3D engines; compositing, by the engine platform server system, the virtual frames into one media stream view of the digital reality application; and sending the composited view to the client device for viewing and interacting with the user.

According to an embodiment, compositing of the virtual frames includes sorting of the virtual frames in 3D space; culling of virtual frames in 3D space; performing depth-masking of virtual frames in order to enable partial blocking of the virtual frames based on the real world elements; requesting ingredients of virtual frames; and combining the virtual frames into one view.

According to an embodiment, the method further includes transitioning from server rendering to local rendering (e.g., transitioning from server-based rendering of 3D icons to local-rendering of 3D objects). The transition may be based on engagement time or engagement levels reached by the user with the digital reality applications. The method includes receiving, by the engine platform server, 3D icons from 3D engines; rendering the 3D icons and sending the 3D icons to the virtual frames; compositing, by the engine platform server, the virtual frames and obtaining media streams with 3D icons; sending the media streams with 3D icons to client devices for local processing, such as performing lightweight tasks on the media streams and displaying to users; checking whether enough time has elapsed or whether deeper levels of engagement have been reached, wherein for a negative case, where a threshold time has not elapsed or a threshold level of engagement has not been reached, the method may loop back to receiving 3D icons from 3D engines; and in a positive case, where a threshold time has elapsed or a threshold level of engagement has been reached, or a combination thereof, authorizing or instructing a client device to download and install the digital reality application including the 3D objects along with a runtime instance of the corresponding one or more 3D engines.

From the perspective of the client device, a disclosed method includes downloading and installing, by the client device, the digital reality applications including the 3D objects, along with a runtime instance of the corresponding one or more 3D engines; rendering, by the client device, the 3D objects locally; and executing, by the client device, the digital reality applications including media streams with 3D objects. According to an embodiment, depending on the duration of the interaction between users and digital reality applications or the level of the interactions, the rendering may be partially performed by the engine servers (e.g., engine platform server or third-party engine servers) or by the client device. When the rendering is performed by a mixture of both engine servers and client devices, the unified media stream view may include both 3D icons and 3D objects. In other embodiments, the rendering may be switched back and forth between the server and the client depending on the quality of service (QoS) available in the network.

According to an alternative embodiment of the transition from server rendering of 3D icons to local rendering of 3D objects, the client device may further be configured to composite the virtual frames after receiving rendered 3D icons from the engine platform server. Comparing the server-composited virtual frames with the client-composited virtual frames, the former case may enable a standard but less flexible frame rate of the media streams displayed to users along with lower bandwidth and client device computing requirements, whereas the latter case may provide a higher frame-rate flexibility of the media streams displayed to users and higher bandwidth and client device computing requirements.

A computer readable medium having stored thereon instructions configured to cause one or more computing devices, such as a server system or client device, to perform methods disclosed herein is also disclosed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
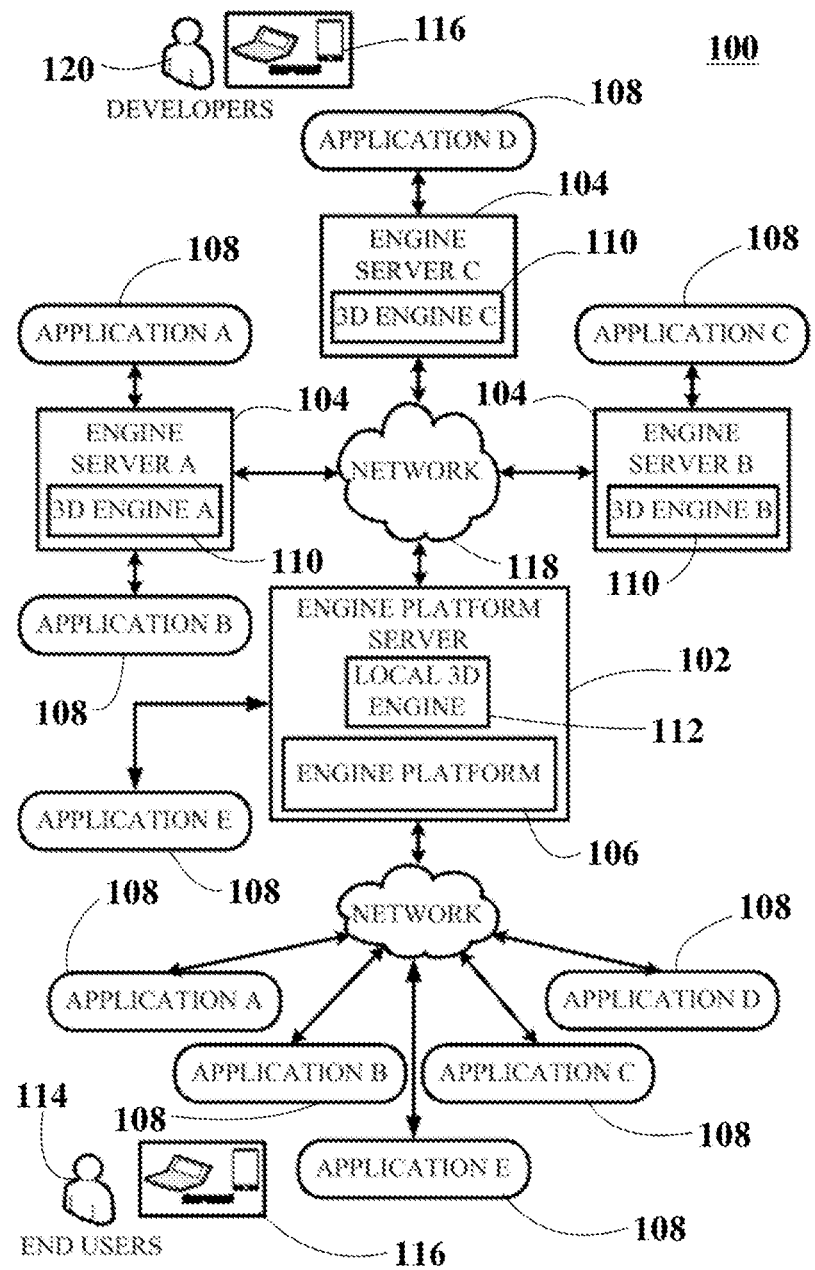
FIG. 1 depicts a schematic representation of a system for enabling a location-based platform for hosting multiple 3D engines delivering location-based 3D content, according to an embodiment.

FIG. 1 depicts a schematic representation of a system 100 for enabling a location-based platform for hosting multiple 3D engines delivering location-based 3D content, according to an embodiment.

The system 100 includes an engine platform server 102 configured to host one or more third-party engine servers 104 and to provide an engine platform 106. The engine platform 106 includes one or more digital reality applications 108 developed via one or more 3D engines, which may be third-party 3D engines 110 or local 3D engines 112.

By way of example, in the illustration of FIG. 1, digital reality applications A-D are developed via third-party 3D engines 110, and digital reality application E is developed via a local 3D engine 112. More specifically, digital reality applications A-B are developed via third-party 3D engine A hosted by engine server A, digital reality application C is developed via 3D engine B hosted by engine server B, digital reality application D is developed via 3D engine C hosted by engine server C, and digital reality application E is developed by local 3D engine 112 hosted by engine platform server 102.

The digital reality applications 108 are anchored in pre-determined locations within a persistent virtual world system or to mobile virtual replicas whose location may change depending on the movement of the corresponding real element. Therefore, a user 114 approaching one of the pre-determined locations may employ a client device 116 in order to view the one or more digital reality applications 108 independent of the 3D engine employed during their development. The client devices 116 connect to the engine platform server 102 via a network 118 and are configured to provide the digital reality applications 108 to users 114, enabling user interaction. In further embodiments, an application developer 120, when accessing the engine platform 106, may be able to view and select from a variety of third-party 3D engines 110 or local 3D engines 112 to develop the digital reality applications 108 employing client devices 116.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas, purely virtual objects and digital reality applications cease, and independent of users being connected to the virtual world system. Thus, the virtual world system is saved in a non-volatile storage location, e.g., in the server 102. In this way, virtual replicas, purely virtual objects and digital reality applications may interact and collaborate with each other when being configured for accomplishing specific goals even if users are not connected to the server.

The system 100 of the current disclosure may be implemented in a cloud to edge infrastructure that may display distributed computing capabilities employing public or private clouds, fog servers, distributed ledger infrastructures, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

The third-party 3D engines 110 available at the engine platform 106 may offer an environment created specially to implement the functionalities that are specific to digital reality applications 108. Thus, the 3D engines are configured to perform tasks that enable implementation of aspects such as the management of an animated model, the collisions between objects, the behavior and interaction of light with individual objects and between the objects of the scene, and the interaction between users and applications. The 3D engine may include, for example, a physical engine to simulate physical laws within the virtual environment, an audio engine to add music and complex acoustical effects, and an artificial intelligence (AI) engine to program computer intelligence behaviors. The 3D engines may be used in any type of application that requires rendering of 3D graphics at a real-time performance, including applications in Virtual Reality (VR), Augmented Reality (AR), Mixed Reality (MR), or combinations thereof.

In some embodiments, the one or more digital reality applications 108 are developed via the one or more 3D engines via systems and methods described with reference to the U.S. patent application Ser. No. 16/421,155, by Cevat Yerli, titled "System and Method for Developing, Testing and Deploying Digital Reality Applications Into the Real World via a Virtual World", and filed on May 23, 2019, which is incorporated by reference herein in its entirety. In such embodiments, a system and method for developing, testing, and deploying digital reality applications into the real or virtual world by integrating, in a digital reality ecosystem, a digital reality application development system and application management system, are provided. In the digital reality application development system, an application developer creates a digital reality application; configures the application, including location and space (i.e., real or virtual location, 3D positioning, and scaling), time, and target user parameter settings; and tests the application in a developer space, in the final real location in augmented reality, and in a virtualized/mixed space in virtual/mixed reality. In the application management system, the application administrator tests the application; approves/rejects the application; sends, when required, adjustment requests to the application developer; and after adjustments, if compliant, deploys the application in an online application store for user access, whereby the application may function based on previously defined and approved content and settings.

In some embodiments, the persistent virtual world system stored in the engine platform server 102 and that enables the selection of a real world location of the digital reality applications is created via a system and method for developing and deploying virtual replicas of real-world elements into a persistent virtual world system. The creation of the virtual replicas is performed in a virtual environment via a replica editor that enables development and configuration of the virtual replicas to mirror the behavior and appearance of the corresponding real elements. The virtual replicas are enriched through data captured by sensing mechanisms that synchronize the virtual replicas with the real-world elements. In an embodiment, the virtual replicas are shared in a persistent virtual world system quality assessment where they can be either approved or rejected for subsequent adjustments, when necessary. After approval and deployment, the replicas are shared in a deployed persistent virtual world system that is viewable to end users for management and interaction of the virtual replicas.

In an embodiment, in order to reduce hardware and network demands, contribute to the reduction of network latency, and improve the general digital reality experience, the system 100 may connect through a network 118 including millimeter-wave (mmW) or combinations of mmW and sub 6 GHz communication systems, such as through $5^{th}$ generation wireless systems communication (5G). In other embodiments, the system may connect through or a wireless local area networking (Wi-Fi) providing data at 60 GHz. Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive digital reality applications 108. This results in high-quality, low latency, real-time digital application content streaming. In other embodiments, the system may communicatively connect through 4th generation wireless systems communication (4G), may be supported by 4G communication systems, or may include other wired or wireless communication systems.

The digital reality applications 108 are viewable by and may be interacted with via client devices 116 that may include one or more mobile devices, personal computers, game consoles, media centers, smart contact lenses, and head-mounted displays, amongst others. The client devices 116 may be equipped with sensors to determine a relative position and orientation of the client device 116 (three coordinates) as well as a relative orientation of the headset (three angles) with respect to the viewer. This tracking information amount to 6 degrees of freedom for the client device 116 that may determine how the output stream will be generated from the plurality of virtual frames.

In some embodiments, the system 100 may use a cloud and edge infrastructure that may implement distributed computing capabilities, comprising employing public or private clouds, cloudlets and edge systems, such as enterprise systems, mobile platforms, and user devices (e.g., client devices 116).

Figure 2:
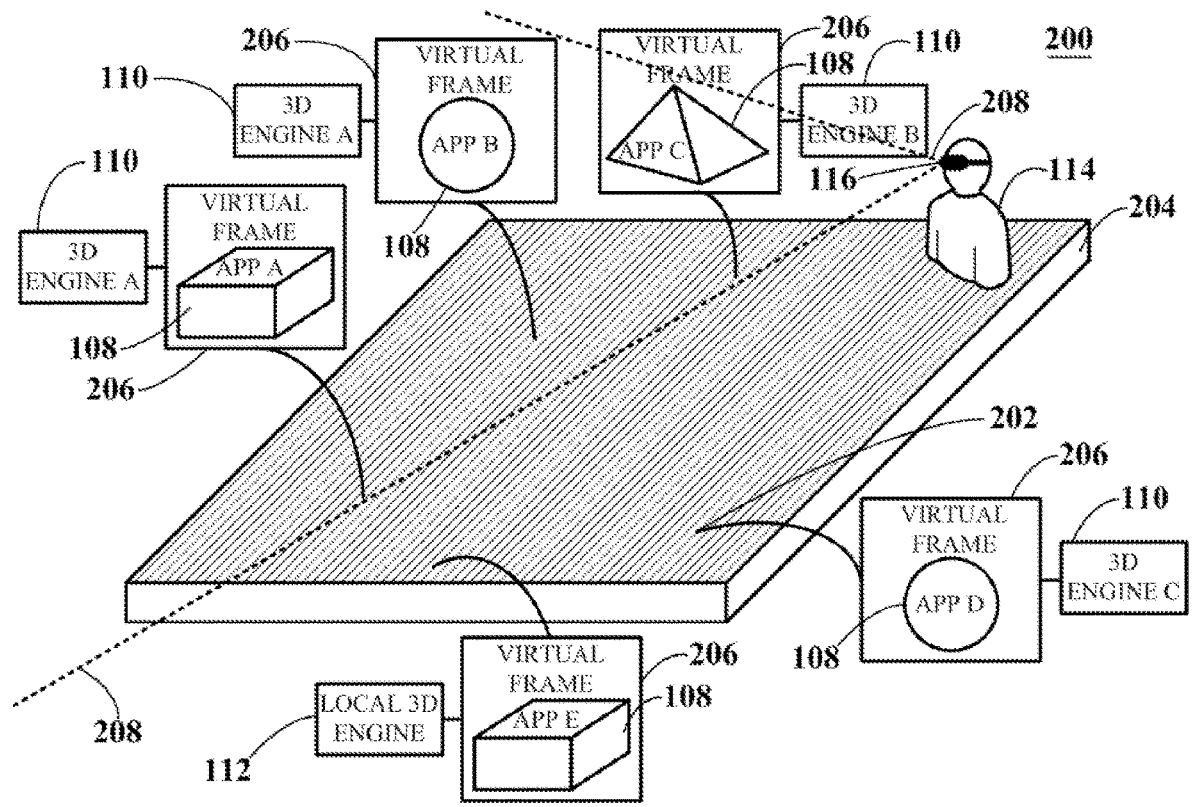
FIG. 2 depicts an isometric schematic representation of a system for enabling a location-based platform for hosting multiple 3D engines delivering location-based 3D content, illustrating a real-world view of the location-based platform with a plurality of applications, according to an embodiment.

FIG. 2 depicts an isometric schematic representation of a system 200 for enabling a location-based platform for hosting multiple 3D engines delivering location-based 3D content, illustrating a real-world view of the location-based platform with a plurality of digital reality applications, according to an embodiment. Some elements of FIG. 2 may be similar to elements of FIG. 1, and thus similar or identical reference numerals may be used to depict those elements.

Referring to FIG. 2, the digital reality applications 108 (e.g., digital reality applications A-E developed by third-party 3D engines 110 A-C and local 3D engine 112, respectively) are associated with (e.g., virtually attached to) one or more pre-determined 3D locations 202 from a real-world location area 204 within the persistent virtual world system stored at the engine platform server. The pre-determined 3D locations 202 are selected during the development of the digital reality applications.

When a digital reality application 208 is virtually attached to an element of the real world, such as a particular 3D location, the digital reality application 208 may, for example, be positioned within a space in tandem with the element to which it is virtually attached. If the digital reality application 208 is unattached, the application may be positioned in a space independent of the position of any object. If the digital reality application 208 is detached from an element to which it was virtually attached, the application may, for example, be removed from a space in which that element is still present, or remain in a fixed location that is independent of the location of that object, or move independently of that object.

In an embodiment when a user 114 employing a client device 116 approaches one or more digital reality applications 108 in one of the pre-determined 3D locations 202, the digital reality applications 108 broadcast a proximity-based signal to the client device 116 so that the client device 116 is aware of the presence of a digital reality application 108 nearby. The client device 116, upon receiving this signal, proceeds to send the viewing position and orientation along with a corresponding view request to the engine platform server. The engine platform server, upon receiving the view request, requests virtual frames 206 from the one or more third-party 3D engines 110 or local 3D engines 112 employed in the development of the one or more digital reality applications 108, and then proceeds to composite each virtual frame 206 into one media stream view that is sent to the client device 116. Thus, the virtual frames 206 are composed of data bits gathered from the one or more 3D engines, as users 114 may be viewing areas that include a plurality of applications developed via several different 3D engines. The engine platform server then sends the composited view to the client device 116, which enables a smooth, natural, low-latency, and real-time view and interaction with the one or more digital reality applications.

As illustrated in FIG. 2, each one of the digital reality applications 108 may be represented visually by 3D icons, such as a right rectangular prism representing digital reality application 108 A and E, a sphere representing digital reality applications B and D, and a pyramid representing digital reality application C. As all of the digital reality applications 108 are available at the 3D engine platform, and since all of the virtual frames 206 corresponding to the visual representation and to the media content of the 3D engines are composited by the engine platform server, the user 114 may seamlessly and continuously view these visual representations of the digital reality applications through the client devices 116, independent of the 3D engine used during their development. In FIG. 2, applications A-C may be comprised within the viewing frustum 208 of the user 114, the virtual frames 206 of which may be composited to the user 114 and output through the client device 116, even though applications A-B are developed via 3D engine A and application C is developed via 3D engine B.

According to an embodiment, the digital reality applications 108 may utilize one or more of a plurality of techniques to broadcast a signal to the client devices 116, alerting the client devices 116 that a digital reality application 108 is available in proximity. In one embodiment, if the user 114 has previously subscribed to the engine platform service, the location of the client device 116 may always be available at the persistent virtual world system available at the engine platform server. Therefore, when a user 114 approaches a digital reality application 108, the digital reality application 108 may already prepare to broadcast the signals to the client device 116. In another embodiment, if the user 114 has previously subscribed to the engine platform service or to one or more specific digital reality applications 108 from the engine platform service, the digital reality application 108 may constantly search for registered devices prior to broadcasting the signal. In another embodiment, the digital reality application 108 may broadcast the signal when the digital reality application 108 detects a client device 116 within a pre-defined proximity threshold in a pre-determined 3D location 202. For example, the pre-determined 3D location 202 may be a building or a room within a building. In another example, the pre-determined 3D location 202 may be within a city block. In a further example, the pre-determined 3D location 202 may be within a city. In one embodiment, as a user 114 with a client device 116 enters a location where the digital reality application is active, the digital reality application may detect a signal from the device, indicating the client device 116 device can receive a digital reality application media stream prior to broadcasting the signal.

In the current disclosure, the term "virtual frame" refers to one of the many image elements (e.g., still images) that compose a virtual animation, which may be included in a media stream conveying the digital content of the digital reality application 108. For example, the virtual frames 206 may be virtual sprites, or two-dimensional bitmaps that are integrated into one larger scene. When the virtual animation is displayed, each virtual frame 206 is flashed to users on the pre-determined 3D locations 202 for a short time. The position and orientation at which the virtual frames 206 are displayed to users depends on the viewing position and orientation of the users, as sensed by the client devices 116.

Figure 3A:
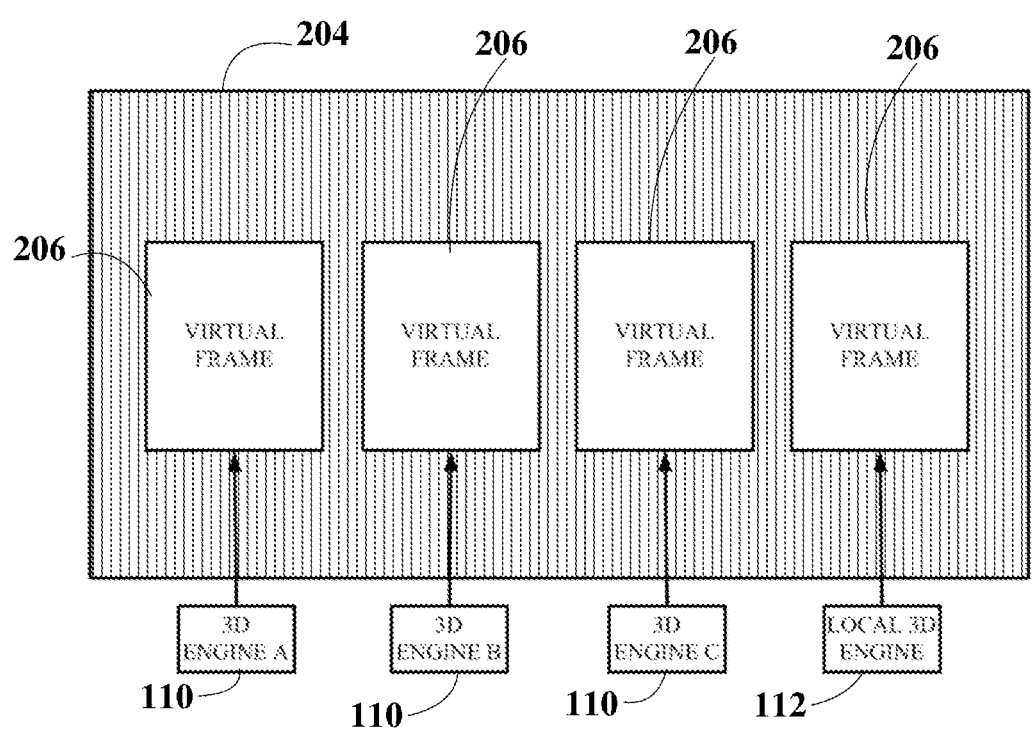
FIG. 3A-3B depict schematic representations of virtual frames, according to an embodiment.
Figure 3B:
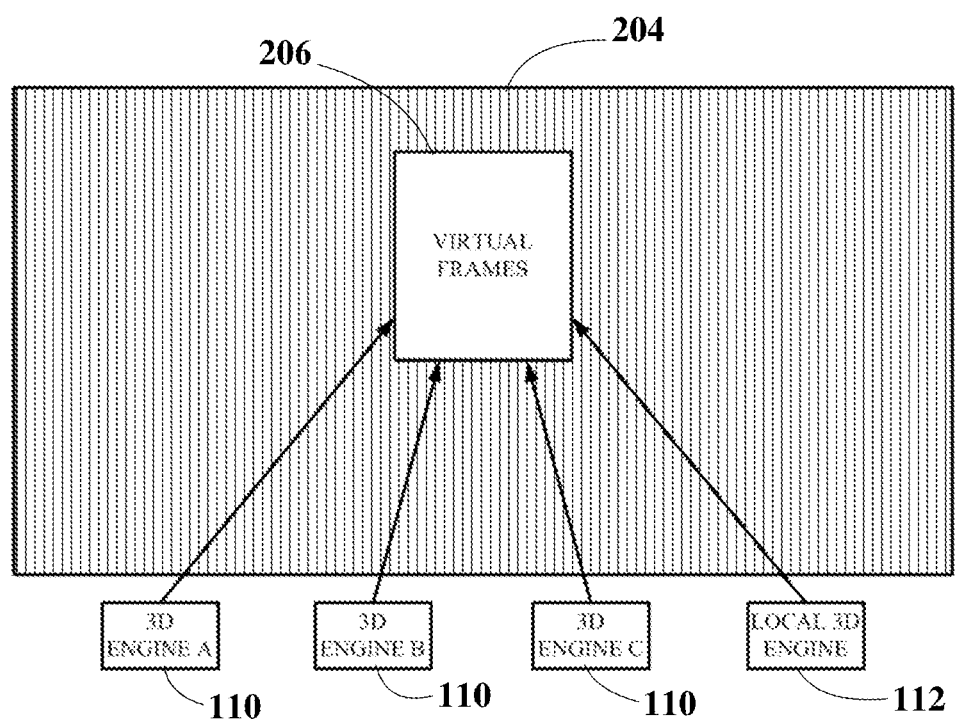

The plurality of virtual frames 206 may be composited in order to generate a single media stream to the client device 116 that may be viewed and interacted with by a user 114. The media stream may include digital reality content including 3D image data, 3D geometries, 3D entities, 3D sensory data, 3D dynamic objects, video data, audio data, textual data, time data, positional data, orientational data, haptic data, and lighting data, amongst others. Computations for compositing the virtual frames 206 may be optimized considering only the applications within the viewing frustum 208 of the user 114. For example, in FIG. 2, only the applications A-C may be comprised within the viewing frustum 208 of the user 114, culling applications D-E because they are located outside of the viewing frustum 208. FIG. 3A-B depicts a schematic representation of virtual frames 206, according to an embodiment. Some elements of FIG. 3A-B may be similar to elements of FIGS. 1-2, and thus similar or identical reference numerals may be used to depict those elements.

As viewed in FIG. 3A, the virtual frames 206 are positioned at a real-world location area 204 and are generated and filled with content from each of the third-party 3D engines 110 and local 3D engines 112, respectively. Virtual frames 206, depending on the viewing frustum of the user, may be generated independently by individual 3D engines, which may be the case when a user is directing his or her view towards an individual digital reality application. However, as viewed in FIG. 3B, the virtual frames 206 may also be generated by more than one 3D engine, which may be the case when a user is directing his or her view towards more than one digital reality applications.

Figure 4:
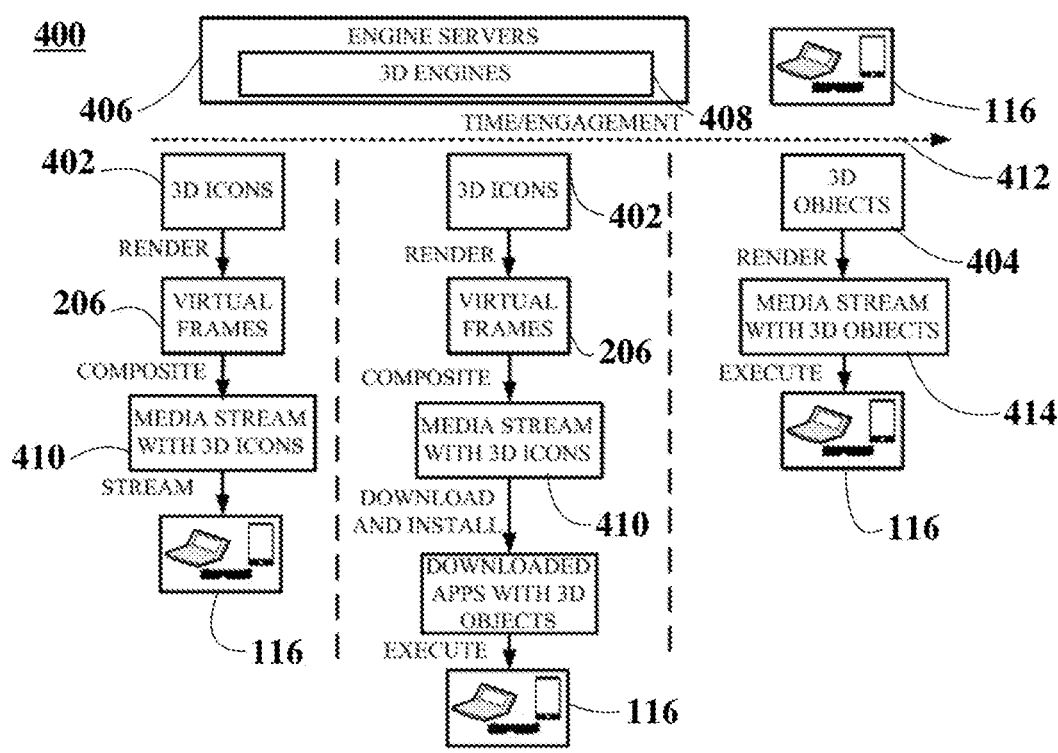
FIG. 4 depicts a schematic representation of a system for enabling a location-based platform for hosting multiple 3D engines delivering location-based 3D content, illustrating a transition from server-rendered 3D icons to client-rendered 3D objects, according to an embodiment.

FIG. 4 depicts a schematic representation of a system 400 for enabling a location-based platform for hosting multiple 3D engines delivering location-based 3D content, illustrating a transition from server-rendered 3D icons 402 to client-rendered 3D objects 404, according to an embodiment. Some elements of FIG. 4 may be similar to elements of FIGS. 1-3B, and thus similar or identical reference numerals may be used to depict those elements.

According to an embodiment, the digital content sent to the virtual frames 206 by the engine servers 406 includes 3D icons 402, which can be one or more voxels, static 3D representations, dynamic 3D representation, or combinations thereof, as determined during the development stage of the digital reality applications via 3D engines 408.

In some embodiments, the virtual frames 206 of the media streams may include elements rendered by the engine platform server. In other embodiments, the virtual frames 206 of the media streams may include elements rendered by the third-party engine servers. In other embodiments, the virtual frames 206 of the media streams may include elements rendered by the client devices 116. In other embodiments, the virtual frames 206 of the media streams may include a mixture of elements rendered by the engine platform server, third-party engine servers, and the client devices 116.

In an embodiment, and referring to the first column from left to right in FIG. 4, the virtual frames 206 of media streams with 3D icons 410 are initially rendered by the engine platform server or by the third-party engine servers, grouped in FIG. 4 into engine servers 406; composited by the engine platform server; and streamed to the client device 116, which outputs the media streams with 3D icons 410. In this embodiment, the client device 116 needs only to perform lightweight operations on the media streams with 3D icons 410.

In further embodiments, and referring to the second column in FIG. 4, as time and/or user engagement 412 with the digital reality application increases, the client device 116 may proceed to fully download and install the digital reality application, after which the client devices 116 may proceed to execute the digital reality applications.

Further in these embodiments, and referring to the third column in FIG. 4, after the digital reality applications have been fully downloaded and installed in the client devices 116, the 3D icons 402 may be converted into 3D objects 404 that are locally rendered and sent to the client device as media streams with 3D objects 414. Then, the client device may finally execute the digital reality applications locally.

Figure 5A:
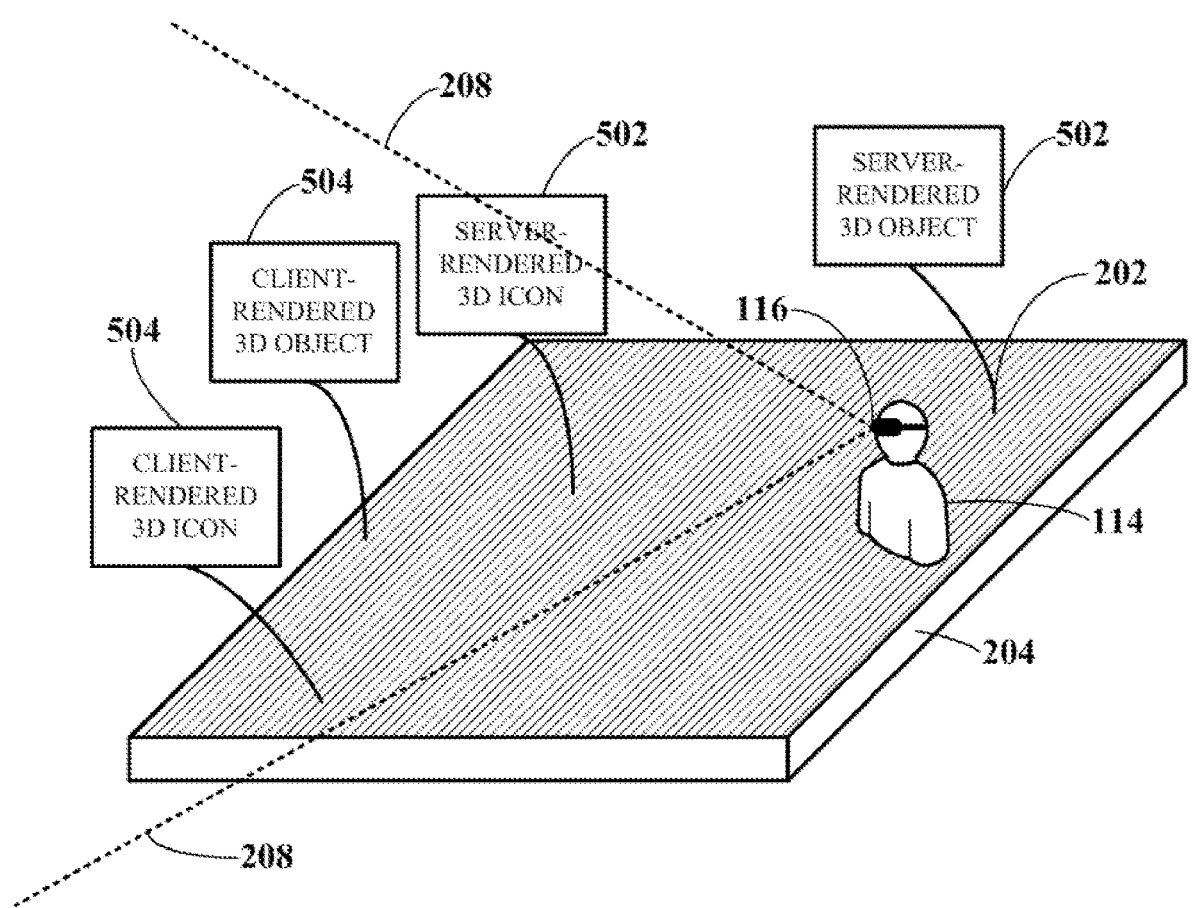
FIG. 5A-5B depict schematic representations of server-rendered 3D icons and client-rendered 3D objects, according to an embodiment.
Figure 5B:
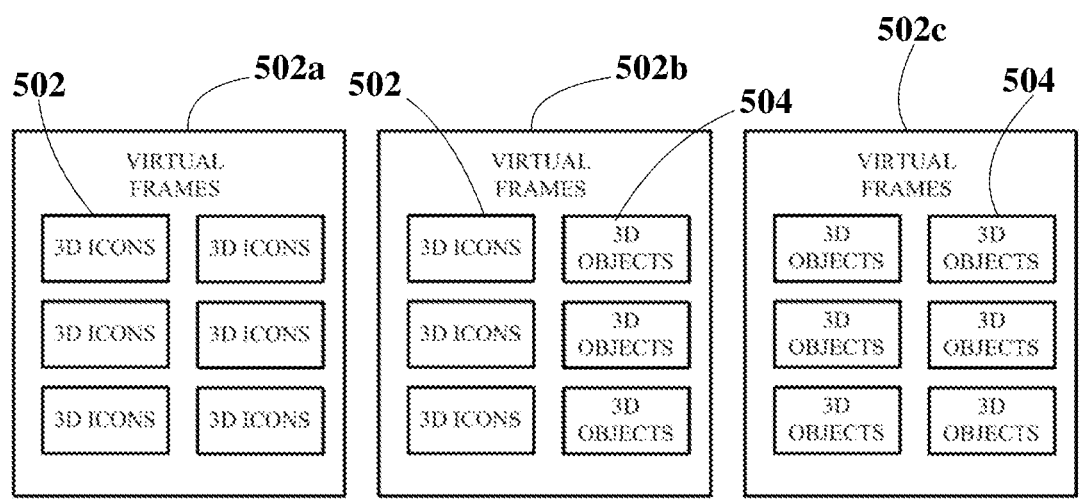

FIG. 5A-B depict schematic representations of server-rendered 3D icons and client-rendered 3D objects, according to an embodiment. Some elements of FIG. 5A-B may be similar to elements of FIGS. 1-4, and thus similar or identical reference numerals may be used to depict those elements.

Referring to FIG. 5A, a user 114 employing a client device 116 located at a real-world location area 204 may view at pre-determined 3D locations 202 one or more visual representations of digital reality applications, which may include one or more server-rendered 3D icons 502, client-rendered 3D objects 504, or combinations thereof, comprised within the viewing frustum 208 of the user 114.

Referring to FIG. 5B, virtual frames that are composited into a media stream view and output via the client devices may include virtual frames 502a-c. Virtual frames 502a may include server-rendered 3D icons 502; virtual frames 502b may include a mixture of server-rendered 3D icons 502 and client-rendered 3D objects 504; and virtual frames 502c may include purely client-rendered 3D objects 504.

Figure 6:
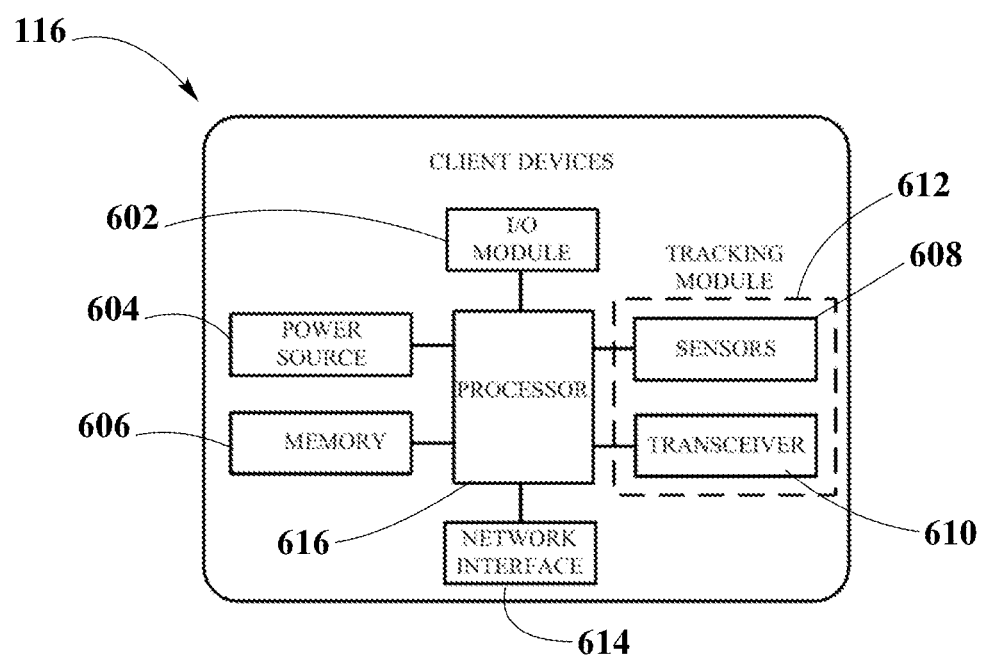
FIG. 6 depicts a schematic representation of a client device, according to an embodiment.

FIG. 6 depicts a schematic representation of a client device 116, according to an embodiment.

A client device 116 may include operational components such as an input/output (I/O) module 602; a power source 604; a memory 606; sensors 608 and transceivers 610 forming a tracking module 612; and a network interface 614, all operatively connected to a processor 616.

The I/O module 602 is implemented as computing hardware and software configured to interact with users and provide user input data to one or more other system components. For example, I/O module 602 may be configured to interact with users, generate user input data based on the interaction, and provide the user input data to the processor 616 before being transferred to other processing systems via a network, such as to a server. In another example, I/O modules 602 is implemented as an external computing pointing device (e.g., a touch screen, mouse, 3D control, joystick, gamepad, and the like) and/or text entry device (e.g., a keyboard, dictation tool, and the like) configured to interact with client devices 116. In yet other embodiments, I/O module 602 may provide additional, fewer, or different functionality to that described above.

The power source 604 is implemented as computing hardware and software configured to provide power to the client devices 116. In one embodiment, the power source 604 may be a battery. The power source 604 may be built into the devices or removable from the devices, and may be rechargeable or non-rechargeable. In one embodiment, the devices may be repowered by replacing one power source 604 with another power source 604. In another embodiment, the power source 604 may be recharged by a cable attached to a charging source, such as a universal serial bus ("USB") FireWire, Ethernet, Thunderbolt, or headphone cable, attached to a personal computer. In yet another embodiment, the power source 604 may be recharged by inductive charging, wherein an electromagnetic field is used to transfer energy from an inductive charger to the power source 604 when the two are brought in close proximity, but need not be plugged into one another via a cable. In another embodiment, a docking station may be used to facilitate charging.

The memory 606 may be implemented as computing hardware and software adapted to store application program instructions. The memory 606 may be of any suitable type capable of storing information accessible by the processor 616, including a computer-readable medium, or other medium that stores data that may be read with the aid of an electronic device, such as a hard-drive, memory card, flash drive, ROM, RAM, DVD or other optical disks, as well as other write-capable and read-only memories. The memory 606 may include temporary storage in addition to persistent storage.

The sensing mechanisms may be implemented as computing hardware and software adapted to obtain data from the real world and determine/track the position and orientation of the client devices 116 and send that information to the engine platform server to determine the position and orientation of the virtual frames and composited media stream view sent to the client devices. For example, the sensors 608 may include one or more cameras, such as one or more depth cameras. The sensors may also include one or more Inertia Measuring Units (IMUs), accelerometers, and gyroscopes. The IMU is configured to measure and report the velocity, acceleration, angular momentum, speed of translation, speed of rotation, and other telemetry metadata of client devices 116 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 610 may be implemented as computing hardware and software configured to enable devices to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 610 may be a two-way communication transceiver 610.

In an embodiment, the tracking module 612 may be implemented by combining the capabilities of the IMU, accelerometers, and gyroscopes with the positional tracking provided by the transceivers 610 and the accurate tracking, low-latency and high QOS functionalities provided by mmW-based antennas may enable sub-centimeter or sub-millimeter positional and orientational tracking, which may increase accuracy when tracking the real-time position and orientation of client devices 116. In alternative embodiments, the sensing mechanisms and transceivers 610 may be coupled together in a single tracking module device.

The network interface 614 may be implemented as computing software and hardware to communicatively connect to a network, receive computer readable program instructions from the network sent by the server or by client devices 116, and forward the computer readable program instructions for storage in the memory 606 for execution by the processor 616.

The processor 616 may be implemented as computing hardware and software configured to receive and process sensor and digital reality application data and instructions. For example, the processor 616 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 616 may receive user input data from I/O module 602 and may respectively implement application programs stored in the memory 606. In other examples, the processor 616 may receive data from sensing mechanisms captured from the real world, or may receive an accurate position and orientation of client devices 116 through the tracking module 612, and may prepare some of the data before sending the data to a server for further processing. In other examples, the processor 616 may perform edge-based rendering of media streams received from the engine platform server while executing the digital reality applications. In other examples, the processor 616 may receive media streams rendered by the engine platform server, and may perform lightweight operations on the media streams in order to output the media streams.

Figure 7:
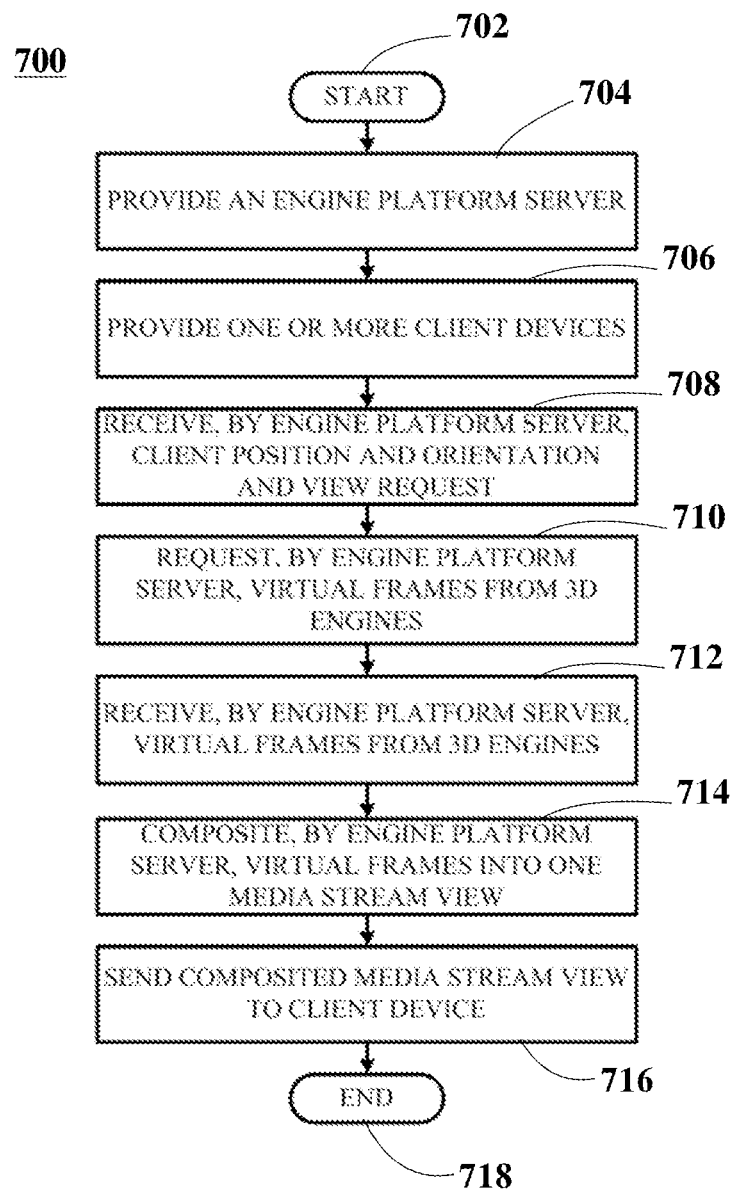
FIG. 7 depicts a method for enabling a location-based platform for hosting multiple 3D engines delivering location-based 3D content, according to an embodiment.

FIG. 7 depicts a block diagram of a method 700 for enabling a location-based platform for hosting multiple 3D engines delivering location-based 3D content, according to an embodiment. Method 700 may be implemented by a system, such as systems depicted with reference to FIGS. 1-6.

Method 700 may begin in blocks 702 and 704 by providing an engine platform server configured to host one or more third-party engine servers and to provide an engine platform, the engine platform further configured to provide digital reality applications developed via one or more 3D engines hosted in the third-party engine servers or engine platform server. The method 700 continues in block 706 by providing one or more client devices connected to the engine platform server via a network and configured to output the digital reality applications and provide a user interface that enables interaction with a user. Subsequently, the method 700 proceeds in block 708 by receiving, by the engine platform server, a client device position and orientation along with a view request associated with a digital reality application, as sent by the client device, which may occur when a user employing a client device approaches a predetermined location where a digital reality application has been positioned during development.

The method 700 continues in step 710 by requesting, by the engine platform server, virtual frames from the one or more 3D engines and then, in step 712, by receiving the virtual frames sent by the one or more 3D engines. Subsequently, the method 700 continues in step 714 by compositing the virtual frames into one media stream view, and finally by sending the composited media stream view to the client device for viewing and interacting with the user, as seen in block 716, ending the process in terminator 718.

Figure 8:
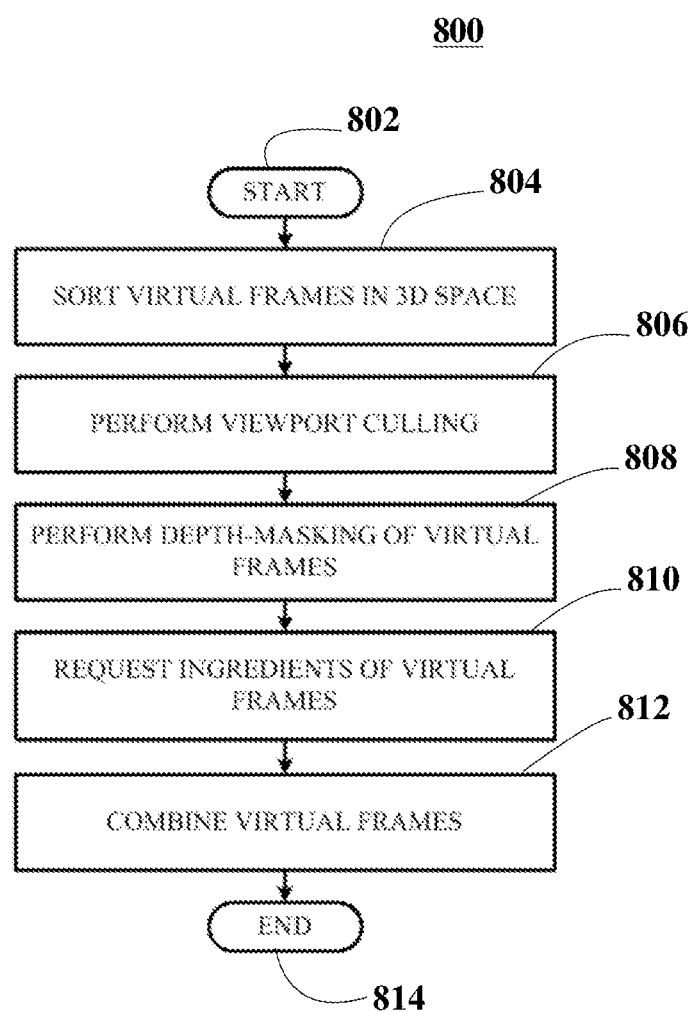
FIG. 8 depicts a method for compositing of virtual frames, according to an embodiment.

FIG. 8 depicts a block diagram of a method 800 for compositing of virtual frames mentioned with reference to FIG. 7, according to an embodiment. Method 800 may be implemented by a system, such as the systems depicted with reference to FIGS. 1-6.

In some embodiments, compositing of the virtual frames is performed independent of the frame rate at which the frames are received, and are transmitted to a user via the client device at a natural frame rate of 60 FPS, 90 FPS, 120 FPS, another frame rate between 60 and 120 FPS, or some other frame rate. At this frame rate range, a user may get a feeling that media stream, and thus the experience from the digital reality application, are received and can be engaged with in real time. In some embodiments, when the third-party engine servers send their corresponding portions of the virtual frames, the third-party engine servers may render these virtual frame portions so that the virtual frames received by the engine platform server are already rendered.

Method 800 begins in blocks 802 and 804 by sorting virtual frames in 3D space. In some embodiments sorting of virtual frames in 3D space refers to arranging the different elements of the virtual frame into a specific position and orientation in 3D space so that the media stream that will result from the animated virtual frames may be adjusted to the viewing position and orientation of the user.

Method 800 continues in block 806 by performing viewport culling of virtual frames in 3D space may remove unnecessary elements from the view frustum of the virtual frame. The elements may be deemed unnecessary because, for example, they may lie completely outside the viewing frustum from the virtual frame, or they may be blocked by real world elements.

Subsequently, method 800 proceeds in block 808 by performing depth-masking of virtual frames in order to enable partial blocking of the virtual frames based on the real world elements. In some embodiments, depth-masking refers to the process of performing a partial blocking of some portions of the virtual frame, especially portions located in the background that may affect the depth of the image displayed on the virtual frame. Depth-masking may be performed employing several techniques known in the art, such as layer masking, clip masking, and alpha-channel masking, amongst others. In some embodiments, depth-masking is performed on geometries that are already available from virtual replicas of real world elements stored in the persistent virtual world system. In other embodiments, the depth-masking is performed on geometries that are generated in real-time by the engine platform server.

Method 800 proceeds in block 810 by requesting ingredients of virtual frames, which may refer to retrieving the actual content of virtual frames corresponding to the digital reality applications which will be part of the unified media stream.

Subsequently, method 800 continues in block 812 by combining the virtual frames into one view. In some embodiments, combining the virtual frames into one view is performed by one or more of warping, stitching and interpolating the plurality of virtual frames, amongst others. Some of these techniques are described in detail in U.S. patent application Ser. No. 15/764,696 filed Mar. 29, 2018, by Cevat Yerli, which is herein incorporated by reference in its entirety. Combining the virtual frames may be a more complex reconstruction process based on the input virtual frames. For example, the processing may rely on a combination of standard image reconstruction techniques, such as stitching, warping, interpolation and extrapolation. For example, extrapolation may be needed in areas where no or limited (visual) information is available based on the available virtual frames, in order to fill up blanks or holes in the media data. However, it is to be understood that the reconstruction process is not limited to computer vision techniques and may further take into consideration spatial data about the scene, which may include one or more of reconstructed 3D geometry information, parameters about materials, and a light field, which may correspond to a flow of light in the captured scene, and the like, in any combination. In some embodiments, the spatial data may be used to re-render the combined virtual frames with 3D rendering techniques. In one or more embodiments, the generation of the output stream may include using a deep learning technique and/or neural networks that can be applied to recreate virtual frames of the output stream from a sequence of virtual frames of the media streams of the same scene taken from different viewpoints. This may enable a complex reconstruction and generation of the output stream even if at least a part of the scene is not captured completely or in full detail.

Method 800 may end in terminator 814.

Figure 9:
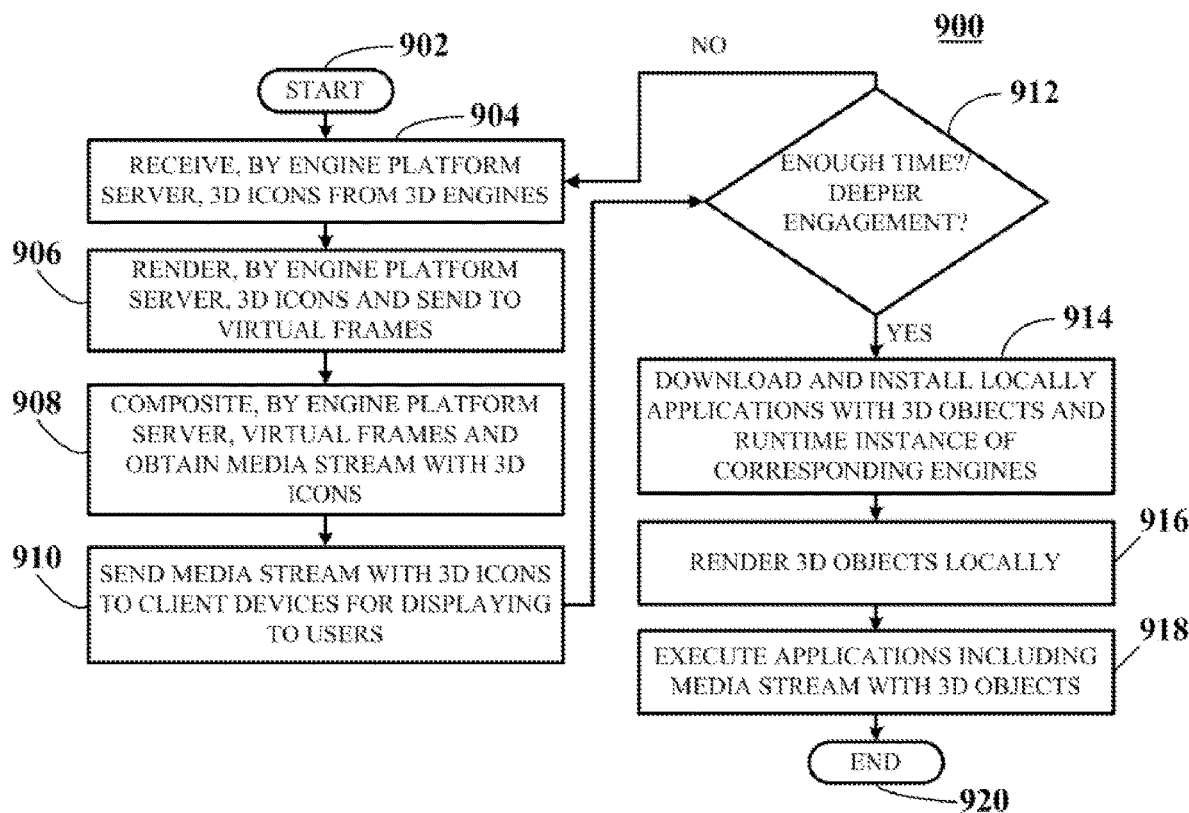
FIG. 9 depicts a method for transitioning from server-rendered 3D icons to client-rendered 3D objects, according to an embodiment.

FIG. 9 depicts a block diagram of a method 900 detailing a transition between server-rendered 3D icons to client-rendered 3D objects, according to an embodiment. Method 900 may be implemented by a system, such as the systems depicted with reference to FIGS. 1-6.

Method 900 begins in blocks 902 and 904 by receiving, by the engine platform server, 3D icons from 3D engines. The 3D engines may be local 3D engines hosted at the engine platform server, or third-party 3D engines hosted at the one or more third-party engine servers. The method 900 continues in block 906 by rendering, by the engine platform server or by the third-party engine servers, the 3D icons, and sending the 3D icons to the virtual frames.

Subsequently, method 900 continues in block 908 by compositing, by the engine platform server, virtual frames and obtaining media streams with 3D icons, which is performed by the engine platform server. In block 910, the method 900 sends the media streams with 3D icons to client devices, which perform lightweight tasks on the media streams in order to display the media streams to users. Then, method 900 checks, in decision block 912, whether enough time has elapsed, whether deeper levels of engagement have been reached, or combinations thereof. In negative case, the method 900 may loop back to block 904 by receiving 3D icons from 3D engines. In positive case, method 900 continues in block 914 by downloading and installing, by the client device, the digital reality applications including the 3D objects along with a runtime instance of the corresponding one or more engines hosted at the engine platform server, and then, in block 916, by rendering the 3D objects locally. In block 918, method 900 continues by executing, by the client device, the digital reality applications including media streams with 3D objects, finally ending the process in terminator 920.

According to an embodiment, depending on the duration of the interaction between users and digital reality applications or the level of the interactions, or combinations thereof, the rendering may be partially performed by the engine servers (e.g., engine platform server or third-party engine servers) or by the client device. When the rendering is performed by a mixture of both engine servers and client devices, the unified media stream view may include both 3D icons and 3D objects. In other embodiments, the transition may switch back and forth between the server and client based on the quality of service (QoS) available in the network.

Figure 10:
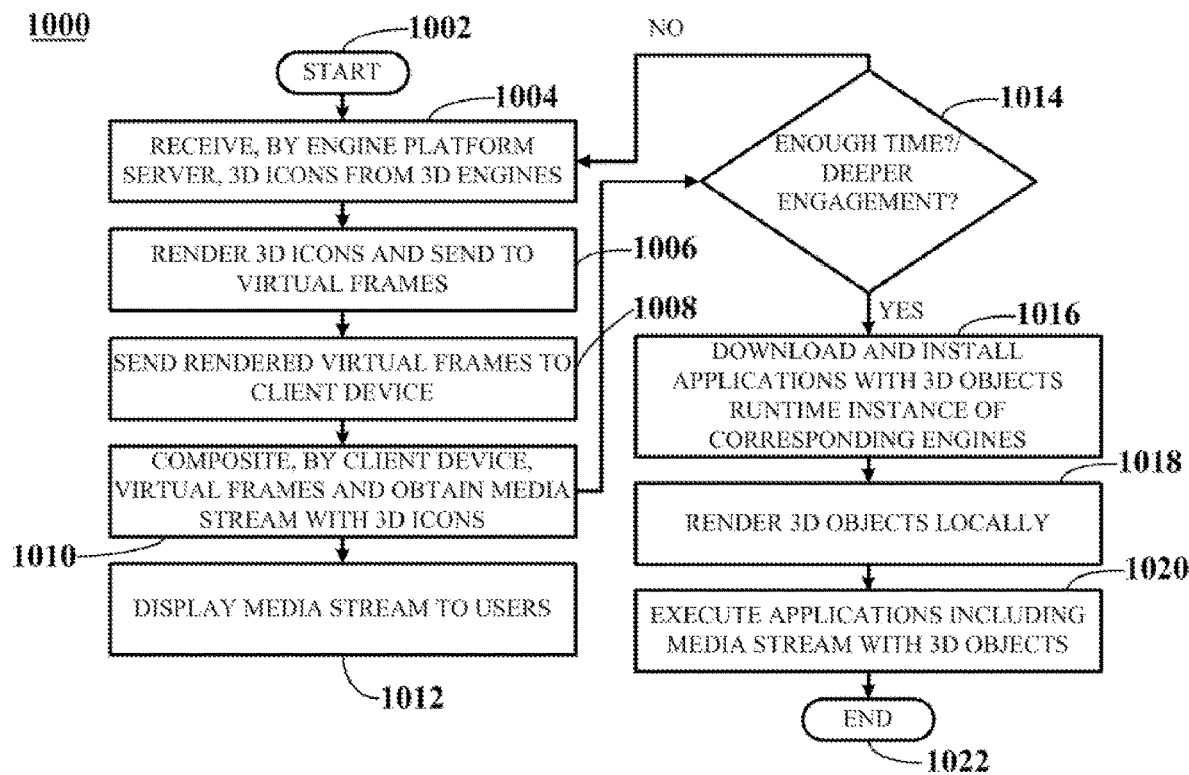
FIG. 10 depicts another method for transitioning from server-rendered 3D icons to client-rendered 3D objects, according to an embodiment.

FIG. 10 depicts a block diagram of a method 1000 detailing an alternative embodiment of the transition between server-rendered 3D icons to client-rendered 3D objects. The transition may be based on engagement time or engagement levels reached by the user with the digital reality applications. In other embodiments, the transition may switch back and forth between the server and client based on the quality of service (QoS) available in the network. Method 1000 may be implemented by a system, such as the systems depicted with reference to FIGS. 1-6.

Method 1000 begins in blocks 1002 and 1004 by receiving, by the engine platform server, 3D icons from 3D engines. The 3D engines may be local 3D engines hosted at the engine platform server, or third-party 3D engines hosted at the one or more third-party engine servers. The method 1000 continues in block 1006 by rendering, by the engine platform server or by the third-party engine servers, the 3D icons, and sending the 3D icons to the virtual frames.

Subsequently, method 1000 continues in block 1008 by sending the rendered virtual frames to the client device. Thereafter, in block 1010, the method 1000 continues by the client device compositing the virtual frames and obtaining unified media streams with 3D icons. Method 1000 then proceeds by the client device performing lightweight tasks on the unified media streams in order to display the media streams to the user, as viewed in block 1012. In decision block 1014, the method 1000 checks whether enough time has elapsed, whether deeper levels of engagement have been reached, or combinations thereof. In negative case, the method 1000 may loop back to block 1004 by receiving 3D icons from 3D engines. In positive case, method 1000 continues in block 1016 by downloading and installing, by the client device, the digital reality applications including the 3D objects along with a runtime instance of the corresponding one or more engines hosted at the engine platform server, and then, in block 1018, by rendering the 3D objects locally. In block 1020, method 900 continues by executing, by the client device, the digital reality applications including media streams with 3D objects, finally ending the process in terminator 1022.

Comparing the server-composited virtual frames of method 900 described in reference to FIG. 9 with the client-composited virtual frames of method 1000 described in reference to FIG. 10, the former case may enable a standard but less flexible frame rate of the media streams displayed to users along with lower bandwidth and client device computing requirements, whereas the latter case may provide a higher frame-rate flexibility of the media streams displayed to users and higher bandwidth and client device computing requirements.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system enabling delivery of location-based 3D content, the system comprising:
    an engine platform server system including one or more server computers, the engine platform server system configured to host one or more engine servers and to provide an engine platform including digital reality applications developed via 3D engines hosted in the engine servers or engine platform server system;
    wherein the digital reality applications are positioned at coordinates in a 3D coordinate space that correspond to pre-determined real-world 3D locations,
    wherein the engine platform system is configured to receive, as a client device approaches one of the pre-determined real-world 3D locations, a viewing position and orientation of the client device along with a corresponding view request from the client device,
    wherein the engine platform server system is configured to, upon receiving the view request, request virtual frames in the form of image elements conveying digital content of the digital reality applications from different 3D engines and composite the virtual frames into one media stream view, and
    wherein the engine platform server system is configured to send the media stream view to the client device.

2. The system of claim 1, wherein the compositing of the virtual frames into the one media stream view comprises:
    sorting of virtual frame sprites in 3D space;
    performing viewport culling of virtual frames in 3D space;
    performing depth-masking of virtual frames in order to enable partial blocking of the virtual frames based on the real world elements;
    and
    combining the virtual frames into one view.

3. The system of claim 2, wherein the depth-masking is performed on geometries that are already available in a database or data structure stored in the engine platform server system or on geometries that are generated in real-time by the engine platform server system.

4. The system of claim 1, wherein the one or more 3D engines comprise one or more local 3D engines hosted in the engine platform server system or one or more third-party 3D engines hosted in one or more third-party engine servers.

5. The system of claim 1, wherein the virtual frames are composited by the engine platform server system independent of a frame rate at which the virtual frames are received.

6. The system of claim 1, wherein the virtual frames are represented as 3D icons, 3D objects, or combinations thereof.

7. The system of claim 1, wherein at least one of the digital reality applications is configured to be downloaded and executed locally by the client device after reaching a predetermined engagement time or level.

8. A method of delivering location-based 3D content, the method comprising:
    receiving, by an engine platform server system, a position and orientation of a client device along with a view request, wherein the engine platform server system is configured to host one or more engine servers and provide an engine platform including digital reality applications developed via one or more 3D engines hosted in the one or more engine servers or the engine platform server system, and wherein the view request is associated with at least one of the digital reality applications;
    requesting, by the engine platform server system, virtual frames in the form of image elements conveying digital content of at least two of the digital reality applications within a viewing frustum of the client device from the one or more 3D engines;

receiving, by the engine platform server system, the virtual frames sent by from the one or more 3D engines; and compositing, by the engine platform server system, the virtual frames of the at least two digital reality applications into a unified media stream view.

9. The method of claim 8, wherein the compositing of the virtual frames comprises:
sorting virtual frame sprites in 3D space;
performing viewport culling of virtual frames in 3D space;
performing depth-masking of virtual frames in order to enable partial blocking of the virtual frames based on real world elements; and
combining the virtual frames into one view.

10. The method of claim 9, wherein the depth-masking is performed on geometries that are already available in a database or data structure stored in the engine platform server or on geometries that are generated in real-time by the engine platform server system.

11. The method of claim 8, wherein the one or more 3D engines comprise a local 3D engine hosted in the engine platform server or a third-party 3D engine hosted in the one or more engine servers.

12. The method of claim 8, wherein the virtual frames are composited by the engine platform server system independent of a frame rate at which the virtual frames are received.

13. The method of claim 8, wherein compositing of the virtual frames comprises transitioning from server rendering of 3D icons to local rendering of 3D objects by:
receiving, by the engine platform server system, the 3D icons from the one or more 3D engines;
rendering, by the engine platform server system or by the engine servers, the 3D icons and sending the 3D icons to the virtual frames;
compositing, by the engine platform server system, the virtual frames and obtaining media streams with the 3D icons; and
sending the media streams with the 3D icons to the client device for local processing.

14. The method of claim 13 further comprising:
if a threshold amount of time has lapsed or a threshold level of engagement has been reached, or a combination thereof, authorizing the client device to download and install the at least one digital reality application including the 3D objects along with a runtime instance of the corresponding one or more 3D engines;
rendering, by the client device, the 3D objects locally;
compositing, by the client device, the virtual frames and obtaining media streams with 3D objects corresponding to the at least one digital reality application; and
executing, by the client device, the at least one digital reality application including media streams with 3D objects.

15. The method of claim 14, wherein the transition from server rendering of 3D icons to local rendering of 3D objects is based on engagement time, engagement levels, or combinations thereof, reached by the user with the at least one digital reality application.

16. The method of claim 14, wherein depending on duration of interaction between the user and the at least one digital reality application or the level of the interactions, the rendering may be partially performed by the one or more engine servers or by the client device.

17. A non-transitory computer readable medium having stored thereon instructions configured to cause a server system to perform steps comprising:
receiving, by an engine platform server system, a position and orientation of a client device along with a view request, wherein the engine platform server system is configured to host one or more engine servers and provide an engine platform including digital reality applications developed via one or more 3D engines hosted in the one or more engine servers or the engine platform server system, and wherein the view request is associated with at least one of the digital reality applications;
requesting, by the engine platform server system, virtual frames in the form of image elements conveying digital content of at least two of the digital reality applications within a viewing frustum of the client device from the one or more 3D engines;
receiving, by the engine platform server system, the virtual frames from the one or more 3D engines; and
compositing, by the engine platform server system, the virtual frames of the at least two digital reality applications into a unified media stream view.

18. The non-transitory computer readable medium of claim 17, wherein the one or more 3D engines comprise a local 3D engine hosted in the engine platform server or a third-party 3D engine hosted in the one or more engine servers.

19. The non-transitory computer readable medium of claim 17, wherein the virtual frames are composited by the engine platform server system independent of a frame rate at which the virtual frames are received.

20. The non-transitory computer readable medium of claim 17, wherein compositing of the virtual frames comprises transitioning from server rendering to local rendering.

* * * * *